UNITED STATES PATENT OFFICE.

WILLIAM LAWRENCE FRYE, OF EDGERTON, KANSAS.

EMBALMING FLUID.

No. 905,168.                  Specification of Letters Patent.            Patented Dec. 1, 1908.

Application filed March 28, 1907. Serial No. 365,153.

*To all whom it may concern:*

Be it known that I, WILLIAM LAWRENCE FRYE, a citizen of the United States, residing at Edgerton, in the county of Johnson and State of Kansas, have invented a new and useful Embalming Fluid, of which the following is a specification.

My invention relates to embalming compounds, and comprises a fluid adapted for injection into a body, and having exceptional preservative, antiseptic and disinfectant qualities.

The fluid is made up of the following ingredients, combined in the proportions stated, viz:

| | |
|---|---|
| Water, substantially pure | 1 gallon. |
| Formalin (40% solution of formaldehyde) | 12 ounces. |
| Mercury bichlorid | 8 grains. |
| Chloral | 10 grains. |
| Sodium chlorid | 1 pound. |

These ingredients are to be thoroughly commingled by agitation, and used by injection in the ordinary way.

I have arrived at the above proportions after much experiment, and find that the resulting mixture possesses preservative qualities of great efficacy, being also antiseptic and disinfectant, thereby lessening the probabilities of risk to the operator, and diminishing the danger in cases where death was due to contagious disease.

What I claim is:—

An embalming fluid, consisting of a mixture of water, one gallon, formalin, twelve ounces, mercury bichlorid, eight grains, chloral ten grains, and sodium chlorid, one pound.

W. LAWRENCE FRYE.

Witnesses:
JOHN R. THORNE,
GEO. W. FOLMER.